United States Patent [19]

Simon

[11] 4,320,914
[45] Mar. 23, 1982

[54] CLAMPING-TYPE HOLDER

[75] Inventor: Avi Simon, Beer Sheva, Israel

[73] Assignee: Beta Engineering & Development Ltd., Beer Sheva, Israel

[21] Appl. No.: 148,483

[22] Filed: May 9, 1980

[30] Foreign Application Priority Data

Jul. 27, 1979 [IL] Israel .......................................... 57914

[51] Int. Cl.³ ................................................. B66C 1/42
[52] U.S. Cl. ................................... 294/88; 294/83 AA
[58] Field of Search .................. 294/88, 83 AA, 86 A, 294/87 SH, 90, 102 R, 116

[56] References Cited

U.S. PATENT DOCUMENTS 3,337,257  8/1967  Brynsvold ...................... 294/83 AA
3,795,420  3/1974  Preston, Jr. ........................... 294/88

FOREIGN PATENT DOCUMENTS 223195  11/1957  Australia ............................... 294/88
1215802  12/1970  United Kingdom .................. 294/88

*Primary Examiner*—James B. Marbert
*Attorney, Agent, or Firm*—Benjamin J. Barish

[57] ABSTRACT

A clamping-type article holder is described particularly useful for clamping test tubes in a conveyor system, the holder comprising a sleeve axially movable within a housing from a first position to a second position, and a plurality of balls carried by the housing and adapted to project through openings formed in one end of the sleeve for clamping the article when the sleeve is in the first position. The latter end of the sleeve is formed with a cam surface effective, upon axial movement of the sleeve to the second position, to withdraw the balls from the opening and thereby to release the article. The holder further includes an electro-magnet effective, when energized, to retain the sleeve in the article-releasing position, which electro-magnet is incapable, when the sleeve is in the article-clamping position, of moving the sleeve to the article-releasing position.

7 Claims, 8 Drawing Figures

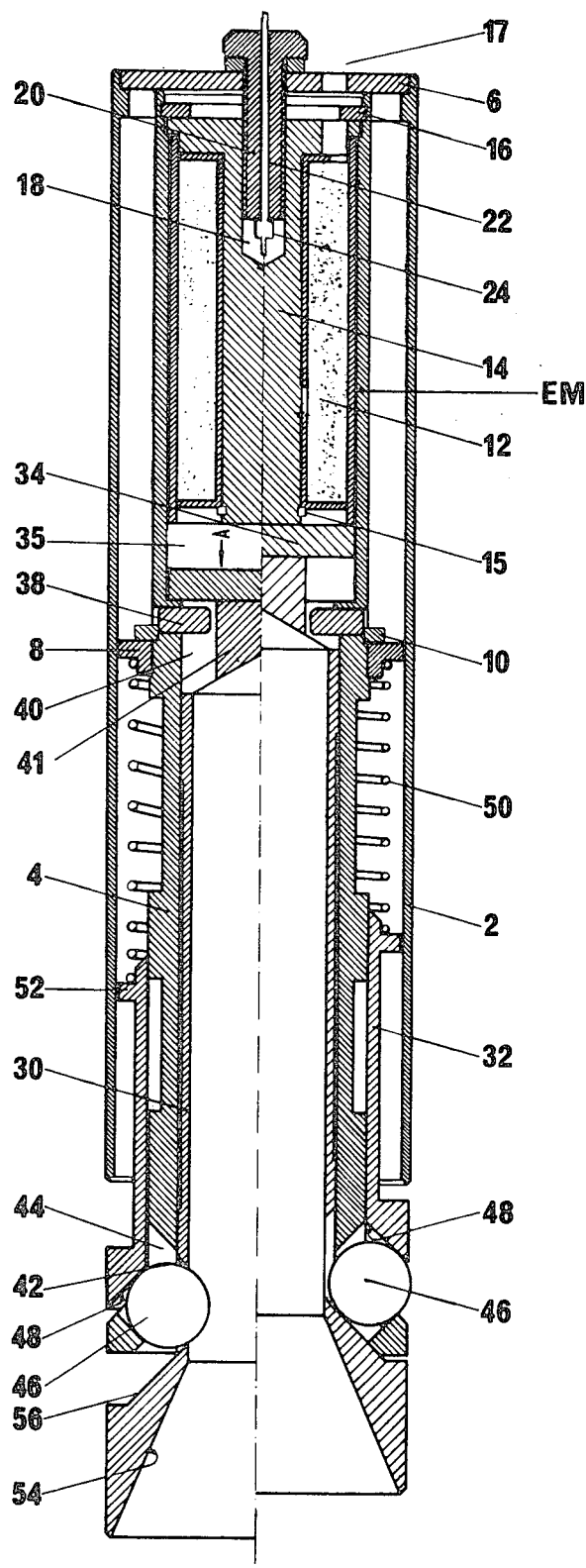
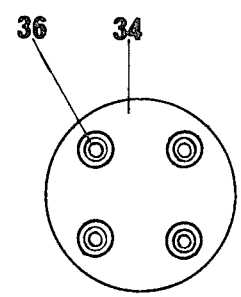
FIG. 2
FIG. 1

CLAMPING-TYPE HOLDER

BACKGROUND OF THE INVENTION

The present invention relates to a clamping-type article holder, namely to a holder which may be clamped to the article, e.g. for conveying the article to another location. The invention is particularly useful as a clamping-type holder for test tubes, and is therefore described below with respect to such an application.

BRIEF SUMMARY OF THE INVENTION

According to a broad aspect of the present invention, there is provided a clamping-type article holder comprising a housing including coaxial inner and outer cylinders, a first sleeve carried by the housing and axially movable along the inner face of the first cylinder from a first position to a second position, and a plurality of balls carried by the housing and adapted to project through openings formed in one end of the first sleeve for clamping the article when the sleeve is in its first position. The article holder further includes a second sleeve axially movable between the inner and outer cylinders, the second sleeve having a cam surface engageable with the balls for urging them to project through the openings in the first sleeve to clamp the article when the first sleeve is in its article-clamping position. One end of the first sleeve is formed with a cam surface effective, upon axial movement of the first sleeve to the second position, to withdraw the balls from the opening and thereby to release the article. The holder further includes retaining means for retaining the first sleeve in the second article-releasing position.

In the preferred embodiment of the invention described below, the retaining means comprises an electromagnet carried by the housing and effective when energized to retain said sleeve in said article-releasing position. More particularly, in the described preferred embodiment, the electromagnet is carried at the end of the housing opposite to said one end of the sleeve; the corresponding opposite end of the sleeve carrying a magnetic member; said electromagnet, when energized, being effective to retain the sleeve in said article-releasing position, but being incapable, when the sleeve is in the article-clamping position, of moving the sleeve to said article-releasing position.

Such a clamping-type article holder may be used in an article carrier system for conveying such articles to desired locations in a simple and convenient manner. Thus, the holder may be suspended from the carrier which positions the holder to select a specifically-located article, e.g. a test tube; lowered over the selected test tube, and actuated to clamp the holder to it. The holder may then be lifted to raise the test tube clamped thereto, and conveyed to any other desired location, and lowered to automatically release the test tube at that location.

The retaining means, namely the electromagnet in the described preferred embodiment, retains the sleeve in the article-releasing position when the sleeve is already in that position, but is incapable of moving the sleeve to the article-releasing position when it is in the article-clamping position. Thus, when the holder has conveyed the article to the desired location and has been released therefrom by lowering the article to its respective supporting surface, the electromagnet may be energized to assure that the holder will be in its article-releasing position for the next cycle of operation; but if the electromagnet is inadvertently energized when the holder is in the article-clamping condition, (e.g., during the process of conveying the article to the desired location), the energization of the electromagnet will be incapable of moving the sleeve to the article-releasing position, thereby preventing an unintentional dropping of the article.

Further features and advantages of the invention will be apparent from the description below.

The invention is herein described, by way of example only, with reference to the accompanying drawings, wherein:

BRIEF DESCRIPTION OF THE DRAWINGS

FIG. 1 is a longitudinal sectional view illustrating one form of clamping-type article holder constructed in accordance with the invention, one half (the left-half) of the figure illustrating the holder in the article-clamping condition, and the other half (right-half) of the figure illustrating the holder in the article-releasing condition;

FIG. 2 is a top plan view illustrating a detail in the construction of the holder of FIG. 1;

DESCRIPTION OF PREFERRED EMBODIMENT

Figure 4A:
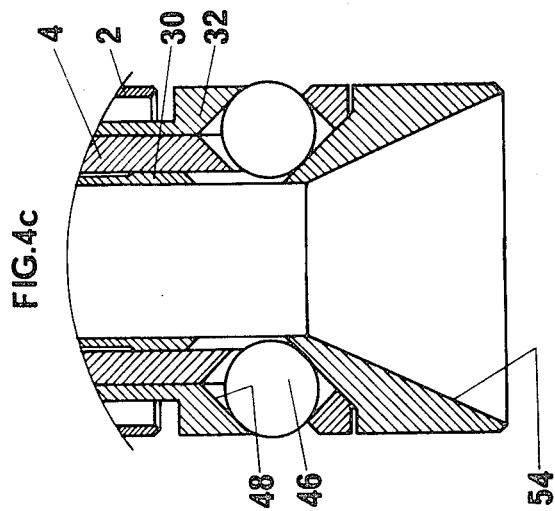
Figure 4B:
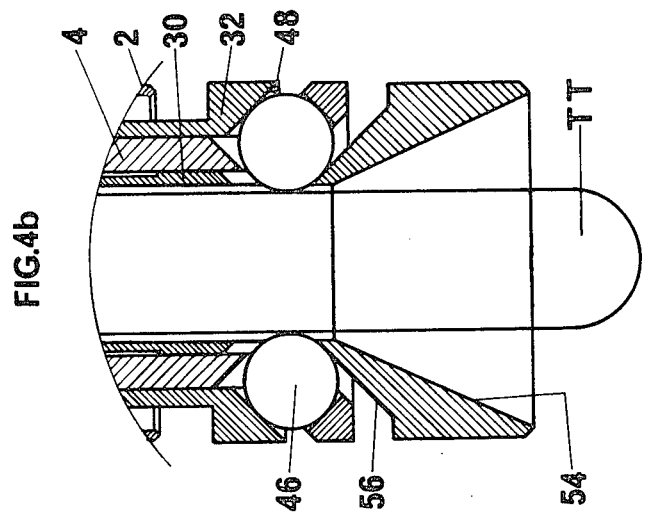

The clamping-type article holder illustrated in the drawings is designed for use with test tubes, such as a small-size test tube TT illustrated in FIG. 4a or a larger size test tube TT' illustrated in FIG. 4b. Briefly, the holder is designed to be lowered over a test tube of either size, or of another in-between size, and then to be actuated to clamp itself to the test tube. The holder may then be raised with the test tube and conveyed to another desired location, whereat the holder may be lowered to bring the test tube into engagement with the support at such other location, this automaticaly releasing the holder from the test tube. When the test tube has been thus released, the holder is retained in its released condition to permit it thereafter to be raised without taking with it the test tube, and to be used for conveying another article to another location.

More particularly, the clamping-type holder illustrated in FIG. 1 comprises a housing including an outer cylinder 2 and an inner cylinder 4 coaxially disposed thereto and closed at its upper end by a circular end plate 6. A collar 8 applied to the inner cylinder 4 about mid-way of its length, and retained by a retainer ring 10, maintains the two cylinders 4 and 2 in spaced coaxial relationship.

An electromagnet EM is disposed in the upper part of the housing between collar 8 and end plate 6. The electromagnet includes a winding 12 and a core 14. Winding 12 is retained on core 14 by a retainer ring 15, and the core is retained on the inner housing cylinder 4 by another retaining ring 16. Winding 12 is adapted to be energized by electrical conductors 17 passing through the end plate 6. Core 14 is formed with a blind bore 18 at its upper end threadedly receiving a plug 20 also passing through end plate 6. Plug 20 is formed with another bore axially therethrough receiving a cord 22. An abutment member 24 is attached to the end of core 22 within bore 18, and the opposite end of the cord is adapted to be attached to a carrier (not shown) supporting the holder in suspension and adaped to lower the holder over the article (e.g., test tube TT) to be engaged by the holder and conveyed to the desired location.

The lower end of the housing carries a first sleeve 30 axially movable along the inner face of the inner housing cylinder 4, and a second sleeve 32 axially movable between the inner housing cylinder 4 and the outer housing cylinder 2. A cap 34 is fixed by a plurality (e.g., four) fasteners 36 (FIG. 2) to the upper end of sleeve 30. Cap 34 is made of magnetic material so as to be attractable by core 14 of the electromagnet EM when the winding 12 of the electromagnet is energized, as will be described more particularly below.

A pin 38 passed through the inner housing cylinder 4, just above the spacing collar 8, is received within a slot 40 extending axially along the upper solid end 41 of sleeve 30. Sleeve 30 is movable from a first position, namely the lower position of the sleeve illustrated in the left half-section of FIG. 1, to a second position illustrated in the right half-section of FIG. 1, and when the sleeve is moved to its upper position, in the manner to be described below, the fixed pin 38 moves along the axial recess 40 of the sleeve to prevent the rotation of the sleeve with respect to the housing, and thereby to constrain the movement of the sleeve to purely an axial movement.

The lower end of sleeve 30 is formed with a plurality (e.g., three) of openings 42, and the lower end of the housing cylinder 4 is similarly formed with a plurality of openings 44 aligned with openings 42. A ball 46 is disposed within each of the aligned openings 42, 44. Openings 44 in the housing cylinder 4 are of larger diameter than the balls 46, but openings 42 in the sleeve 30 are of smaller diameter than the balls, permitting the balls to project partly through the latter openings for clamping the article (e.g., test tube TT in FIG. 4a) to be engaged by the holder. The balls 46 are urged to their inner, article-clamping positions by the lower surface 48 of sleeve 32, the latter sleeve being biassed downwardly against the balls 46 by a coil spring 50 interposed between a shoulder 52 formed at the upper end of sleeve 32, and collar 8 attached to the inner housing cylinder 4.

The lower end of the inner sleeve 30 is formed with a conical surface 54 increasing in diameter towards the outer end of the sleeve. In addition, this sleeve 30 is formed with cam surfaces 56 bordering the openings 42 receiving the balls 46. When sleeve 30 is moved upwardly, cam surfaces 56 are adapted to move the balls 46 from their inner, article-clamping positions as illustrated in the left half-section of FIG. 1, to their outer article-releasing positions as illustrated in the right half-section of FIG. 1.

The operation of the holder illustrated in FIG. 1 will now be described particularly with reference to FIGS. 3a–3c and 4a–4c.

Figure 3A:
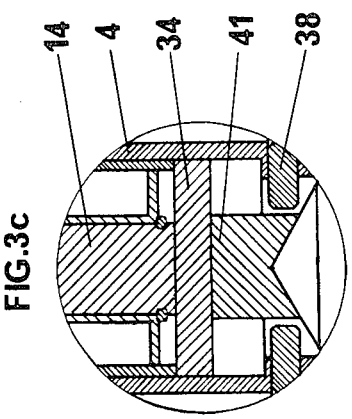
FIGS. 3a and 4a are fragmentary views of the upper and lower ends of the holder of FIG. 1 during its article-clamping condition.
Figure 3B:
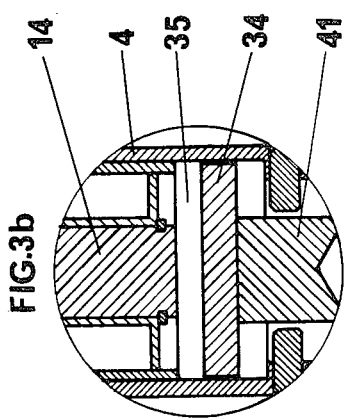
FIGS. 3b and 4b are views corresponding to FIGS. 3a and 4a, except when used with respect to a larger-diameter article.
Figure 3C:
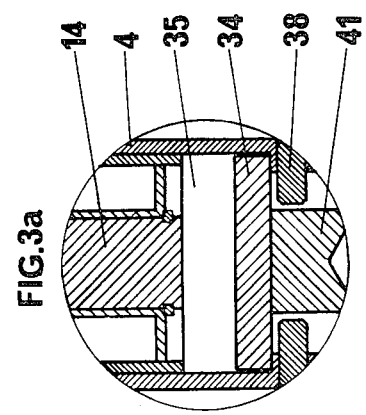
FIGS. 3c and 4c are views corresponding to those of FIGS. 3a and 4a illustrating the article-releasing condition of the holder.
Figure 4C:
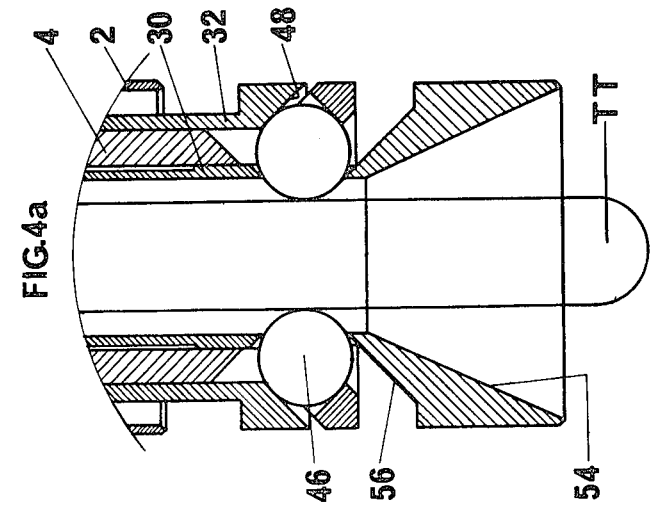

First, with reference to FIGS. 3c and 4c, these figures illustrate the article-releasing condition of the holder. In this condition, the electromagnet EM is energized so that the magnetic cap 34 carried at the upper end 35 of the sleeve 30 is attracted by the electromagnet core 14 to retain the sleeve 30 in its upper position wherein cam surfaces 56 at the lower end of the sleeve move the balls 46 out of openings 42, as in the right half-section illustrated in FIG. 1.

When the holder is in this article-releasing condition as illustrated in FIGS. 3c and 4c, the holder is lowered over the article to be champed and to be conveyed by the holder to another location. FIGS. 3a and 4a illustrate the condition of the holder when applied to a relatively small diameter test tube TT, and FIGS. 3b and 4b illustrate the condition of the holder when applied to a larger diameter test tube TT'. In both cases, the holder will be automatically clamped to the test tube, so as to enable the holder to lift the test tube and to convey it to another location.

Thus, with reference to test tube TT illustrated in FIG. 4a, after the holder is applied to that test tube, the electromagnet EM is deenergized permitting the inner sleeve 30 to move downwardly under its own weight, at which time the balls 46 are urged inwardly through openings 42 in contact with the test tube TT by cam surface 48 at the lower end of sleeve 32, the latter sleeve being urged downwardly by spring 50. When the test tube being clamped is of relatively small diameter as indicated by test tube TT in FIG. 4a, sleeve 30 will be moved downwardly a relatively larger distance, thereby providing a relatively large space 35 between the magnetic cap 34 at the upper end of the sleeve, and the lower face of the electromagnet core 14. On the other hand, when the test tube being clamped is of relatively large diameter, as indicated by test tube TT' in FIG. 4b, the sleeve 30 will move downwardly a shorter distance, thereby providing a relatively small space 35 between cap 34 and the core 14. In any event, the electromagnet is designed so that, when it is energized, it produces a sufficient magnetic force to retain the sleeve 30 in its upper position only when its magnetic cap 34 is in contact with the electromagnet core 14, the force produced by the electromagnet being insufficient to attract the cap 34 to the core whenever there is a significant space between the two as indicated by space 35 in either FIGS. 3a or 3b. Thus, should the electromagnet EM be inadvertently energized when the holder is in the article-clamping condition as illustrated either in FIGS. 4a or 4b, the force produced by the electromagnet will be insufficient to lift sleeve 30, and therefore will be insufficient to cause the accidental actuation of the holder to its article-releasing condition.

It will be seen that the holder is self-locking, that is the weight of the test tube, together with the force of the spring 50, tends to increase the gripping force applied by the balls 46.

The holder can be actuated to the article-releasing condition only by physicaly moving sleeve 30 upwardly until its magnetic cap 34 engages the lower face of the electromagnet core 14, as indicated in FIGS. 3c, 4c, and the right half-section of FIG. 1. This would normally be done by lowering the holder until the lower end of sleeve 30 engages the fixed support, whereupon further lowering of the holder causes the housing cylinders 2 and 4 to move downwardly with respect to sleeve 30, thereby raising the sleeve relative to the housing cylinders, until cap 34 engages the lower face of the electromagnet core 14, at which time the electromagnet may be energized to cause it to retain the cap 34, and the sleeve 30, in their raised article-releasing condition.

While the invention has been described with respect to one preferred embodiment, it will be appreciated that many other variations, modifications and applications of the invention may be made.

What is claimed is:

1. A clamping-type article holder, comprising: a housing including coaxial inner and outer cylinders; a first sleeve carried by said housing and axially movable along the inner face of the first cylinder from a first position to a second position; a plurality of balls carried by said housing and adapted to project through openings formed in one end of the first sleeve for clamping the article when the sleeve is in said first position; a second sleeve axially movable between said inner and outer cylinders; said second sleeve having a cam surface engageable with the balls for urging same to project through the openings in the first sleeve to clamp the article when the first sleeve is in its article-clamping position; said one end of the first sleeve being formed with a cam surface effective, upon axial movement of the first sleeve to said second position, to withdraw the balls from the openings and thereby to release the article; and retaining means for retaining said first sleeve in said second, article-releasing position.

2. A holder according to claim 1, wherein said retaining means comprises an electromagnet carried by the housing and effective when energized to retain said sleeve in said article-releasing position.

3. A holder according to claim 2, wherein said electromagnet is carried at the end of the housing opposite to said one end of the sleeve; the corresponding opposite end of the sleeve carrying a magnetic member; said electromagnet, when energized being effective to retain the sleeve in said article-releasing position, but being incapable, when the sleeve is in the article-clamping position, of moving the sleeve to said article-releasing position.

4. A holder according to claim 1, wherein said first sleeve is further formed with a conical opening of increasing diameter towards the outer end of the sleeve.

5. A holder according to claim 1, wherein said second sleeve is biassed to urge the balls to their article-clamping positions by a coil spring disposed between the inner and outer housing cylinders.

6. A holder according to claim 1, wherein said inner housing cylinder includes a pin projecting radially therethrough and received in a recess formed axially along the inner housing sleeve for preventing rotation thereof relative to the housing.

7. A holder according to claim 1, wherein the inner housing cylinder is formed, for each of said balls, with an opening of slightly larger diameter than that of the respective ball and aligned with the respective opening in the inner sleeve.

* * * * *